United States Patent
Bestetti et al.

(10) Patent No.: US 11,706,844 B2
(45) Date of Patent: Jul. 18, 2023

(54) COOKTOP WITH A HEATING COATING

(71) Applicant: VERNICIATURE BRESCIANE S.R.L., Torbole Casaglia (IT)

(72) Inventors: Massimiliano Bestetti, Castegnato (IT); Gianluca Ghizzardi, Castegnato (IT)

(73) Assignee: VERNICIATURE BRESCIANE S.R.L., Torbole Casaglia (IT)

(*) Notice: Subject to any disclaimer, the term of this patent is extended or adjusted under 35 U.S.C. 154(b) by 582 days.

(21) Appl. No.: 16/954,869

(22) PCT Filed: Sep. 18, 2018

(86) PCT No.: PCT/IB2018/057172
§ 371 (c)(1),
(2) Date: Jun. 17, 2020

(87) PCT Pub. No.: WO2019/064123
PCT Pub. Date: Apr. 4, 2019

(65) Prior Publication Data
US 2021/0092801 A1    Mar. 25, 2021

(30) Foreign Application Priority Data
Sep. 29, 2017  (IT) .................. 102017000109605

(51) Int. Cl.
| H05B 3/14 | (2006.01) |
| C09D 7/40 | (2018.01) |
| C03C 17/00 | (2006.01) |
| C03C 17/30 | (2006.01) |
| C09D 5/24 | (2006.01) |
| C09D 183/04 | (2006.01) |
| C09D 183/10 | (2006.01) |
| F24C 7/06 | (2006.01) |
| F24C 15/10 | (2006.01) |
| H05B 3/26 | (2006.01) |
| H05B 3/74 | (2006.01) |

(52) U.S. Cl.
CPC ........... *H05B 3/145* (2013.01); *C03C 17/007* (2013.01); *C03C 17/009* (2013.01); *C03C 17/30* (2013.01); *C09D 5/24* (2013.01); *C09D 7/70* (2018.01); *C09D 183/04* (2013.01); *C09D 183/10* (2013.01); *F24C 7/067* (2013.01); *F24C 15/102* (2013.01); *H05B 3/146* (2013.01); *H05B 3/265* (2013.01); *H05B 3/74* (2013.01); *C03C 2217/445* (2013.01); *C03C 2217/475* (2013.01); *C03C 2217/479* (2013.01); *C03C 2217/48* (2013.01); *H05B 2203/013* (2013.01); *H05B 2203/017* (2013.01); *H05B 2214/04* (2013.01)

(58) Field of Classification Search
CPC ........ H05B 3/145; H05B 3/146; H05B 3/265; H05B 3/74; H05B 2203/013; H05B 2203/017; H05B 2214/04; C09D 5/24; C09D 185/04; C09D 185/10; F24C 7/067; F24C 15/102; C03C 2217/445; C03C 2217/475; C03C 2217/479; C03C 2217/48
See application file for complete search history.

(56) References Cited

U.S. PATENT DOCUMENTS

| 4,064,074 A | * | 12/1977 | Ellis ..................... H05B 3/145 252/502 |
| 2006/0027555 A1 | * | 2/2006 | Aisenbrey ............. H05B 3/146 219/385 |
| 2007/0029307 A1 | * | 2/2007 | Erickson ............... H05B 3/145 219/543 |
| 2008/0190912 A1 | | 8/2008 | Yeung |
| 2010/0122980 A1 | | 5/2010 | Wang et al. |
| 2013/0222510 A1 | | 8/2013 | Kim et al. |
| 2015/0101849 A1 | * | 4/2015 | Bockmeyer ......... H05K 1/0274 977/932 |
| 2016/0302260 A1 | * | 10/2016 | Miller ..................... H01B 1/18 |
| 2022/0400898 A1 | * | 12/2022 | Park ...................... F24C 7/082 |

FOREIGN PATENT DOCUMENTS

| DE | 10 2010 043 534 A1 | 5/2012 |
| ES | 2 574 622 A1 | 6/2016 |
| WO | 2008085550 | 7/2008 |
| WO | 2015/185284 A1 | 12/2015 |

OTHER PUBLICATIONS

Office Action for Chinese Patent Application No. 201880075071.4 dated Jan. 17, 2022, 10 pages.
Zunning, Z., "Fundamentals of Optoelectronic Countermeasures", Beijing Institute of Technology Press, 11 pages (2017), Machine-generated translation.
International Search Report and Written Opinion of the International Searching Authority for corresponding International Patent Application No. PCT/IB2018/057172 dated Nov. 6, 2018, 10 pages.
European Examination Report received in corresponding application dated Jun. 27, 2022, 8 pages.

* cited by examiner

*Primary Examiner* — Shawntina T Fuqua
(74) *Attorney, Agent, or Firm* — Merchant & Gould P.C.

(57) ABSTRACT

A cooktop includes a base and an electrically conductive coating applied to the lower surface of the base. The coating is composed of a paint containing electrically conductive particles dispersed in a silicone or polyester-silicone or epoxy-silicone resin. The conductive particles are selected from the group consisting of multi-wall or single-wall carbon nanotubes, graphene, copper metallic particles, nickel metallic particles, or combinations thereof.

10 Claims, No Drawings

COOKTOP WITH A HEATING COATING

This application is a National Stage Application of PCT/IB2018/057172, filed 18 Sep. 2018, which claims the benefit of Serial No. 102017000109605, filed 29 Sep. 2017 in Italy, and which applications are incorporated herein by reference. To the extent appropriate, a claim of priority is made to each of the above-disclosed applications.

FIELD OF THE INVENTION

The invention falls within the field of kitchen appliances and in particular refers to a cooktop consisting of a base and a heating coating.

STATE OF THE ART

The cooktops known today consist of a base in glass-ceramic material and heating elements placed underneath the base.

The cooktops made of glass-ceramic material have excellent mechanical features and thermal conduction which is strongly directional: excellent in the direction orthogonal to the cooktop and poor in the direction parallel to the cooktop. The heating elements, placed under the glass-ceramic base, operate through two principles: magnetic induction and radiant heat.

In the first case, electromagnetic induction requires the use of ad hoc pots with a base made of a material capable of coupling electromagnetically with the coil field of the heating element.

In the second case, the heating occurs by radiant heat through conductive spirals of the heating element, penetrated by electric current, which radiate heat to the base, from the lower surface to the upper surface of the glass-ceramic cooktop.

In both cases, therefore, there are drawbacks.

Solutions are also known wherein the heating elements are comprised of thin films. For example, WO 2015/185284 proposes the use of indium tin oxide ITO films as heating elements. The use of ITO films is problematic, however, due to the scarcity of indium.

OBJECT OF THE INVENTION

The object of the present invention is to create a conduction-heated cooktop that overcomes the drawbacks mentioned above with reference to the prior art, and in particular that ensures excellent performance, while maintaining great simplicity of production.

DESCRIPTION OF THE INVENTION

According to a preferred embodiment of the invention, a cooktop comprises a base having an upper surface, on the side intended to support cooking containers such as pots, pans and the like, or food to be cooked directly, and, on the other side, a lower surface and an electrically conductive coating applied to the lower surface of the base.

Preferably, the base is flat, in the form of a plate, for example square, circular or polygonal.

The base is made of a thermal conductive material, e.g. glass-ceramic.

Said coating is obtained by the application of a paint, applied to the entire surface or, alternatively, to regions thereof.

The coating is operationally connected to an electric power supply, for example through a distribution grid that distributes the current to multiple points on the coating in order to obtain a homogeneous distribution of current or a concentration in predefined areas, in a controlled manner.

Preferably, the electric power supply is provided through components such as wires, ribbons, strips, films and the like.

The electrical supply of the coating is either direct current, e.g. 12 V or 24 V, or alternating current, e.g. 220 V/50 Hz.

When the coating is supplied with electric current, the coating is heated by the Joule effect and thus the upper surface of the base is heated by conduction.

Advantageously, the upper surface of the cooktop is heated very evenly, due to the surface distribution of the coating. Even in the case wherein the coating is applied only to regions of the lower surface of the base, for example in the shape of a disc or a ring, the heating of such regions is uniform.

This differentiates the invention from the conduction cooktops of the prior art, for which the heating is concentrated in the zone corresponding to the heating coil.

The paint for obtaining the coating preferably comprises silicone or polyester-silicone or epoxy-silicone resin or combinations thereof.

In addition, the solvent used is water or organic solvent.

According to the invention, the paint is loaded with electrically conductive particles.

These conductive particles are preferably carbon allotropes, such as single-wall or multi-wall carbon nanotubes, graphene, or copper or nickel metallic particles, or combinations of copper and nickel.

According to a variant embodiment, said conductive particles provide for a mixture of the aforesaid carbon allotropes and metallic particles, e.g. carbon nanotubes and copper and/or nickel particles.

According to one variant embodiment, the paint contains dispersants, such as surfactants, gum arabic, serinol pyrrole, etc., suitable to prevent or limit the agglomeration of the particles.

Before the paint is applied, the conductive particles are mechanically dispersed using ultrasound or a paddle mixing system.

Preferably, the paint contains carbon nanotubes in an amount of 0.1%-20% by weight, and, in any case, in such quantity as to allow temperatures above 300° C., usually 340-350° C., to be reached, necessary to obtain a cooktop. Generally, the quantity of nanotubes is such that the cooking surface takes on a black color.

Preferably, the percentage of conductive particles in the paint is between 0.1% and 40% by weight.

The paint may be applied by roller, spray, glazing, silkscreen printing, pad printing or immersion.

The paint is then heat-treated, e.g. at 250° C. for 10 minutes, to obtain the final coating.

The thickness of the coating after firing is between 1 μm and 200 μm.

According to one embodiment of the invention, the entire coating or portions of it are made separately from the base of the cooktop in the form of a sheath or flexible film or in the form of a rigid plate then applied to the base of the cooktop.

Preferably, the electrical surface conductivity of the paint is between 5 Ω/sq and 1000 Ω/sq.

Example 1

A conductive silicone paint loaded with carbon nanotubes was applied by roller to the lower face of a glass-ceramic base of a cooktop. The content of carbon nanotubes in the paint is 15%. The paint was then fired for 10 minutes at 250° C. in air. The resulting coating was then electrically connected via a copper grid to a 220 V/50 Hz AC power supply. After a few minutes, the top surface of the base reached a temperature of 400° C. and was maintained there for 60 minutes.

Example 2

A conductive silicone paint with 5% multi-wall carbon nanotubes and 10% copper metallic particles was applied with a roller to the lower face of the glass-ceramic base of a cooktop. The paint was then fired for 10 minutes at 250° C. in air. The resulting coating was then electrically connected via a copper grid to a 220 V/50 Hz AC power supply. After a few minutes, the top surface of the base reached a temperature of 400° C. and was kept there for 60 minutes.

Innovatively, the cooktop according to the present invention overcomes the drawbacks of the solutions of the prior art, as it allows a very homogeneous distribution of heat on the lower surface, improving the performance of the device.

At the same time, the cooktop is simple and economical to make, because the paint does not comprise rare or hard-to-find components.

It is clear that one skilled in the art, in order to meet contingent needs, may make changes to the cooktop described above, all contained within the scope of protection defined by the following claims.

The invention claimed is:

1. A cooktop comprising:
   a base having an upper surface and a lower surface;
   an electric power supply for supplying an electrically conductive coating with electric current; and
   an electrically conductive coating applied to said lower surface and operationally connected to said electric power supply;
   wherein said coating consists of a paint containing electrically conductive particles, dispersed in a silicone or polyester-silicone or epoxy-silicone resin, wherein said conductive particles are selected from the group consisting of multi-wall carbon nanotubes, single-wall carbon nanotubes, graphene, copper metallic particles, nickel metallic particles, or combinations thereof;
   wherein when the coating is supplied with electric current, the coating is heated by the Joule effect and the upper surface of the base is heated by conduction.

2. A cooktop according to claim 1, wherein the base is made of glass-ceramic.

3. A cooktop according to claim 1, wherein the paint contains carbon nanotubes in an amount of 0.1% to 20% by weight.

4. A cooktop according to claim 1, wherein the paint contains metallic particles in an amount of 0.1% to 40% by weight.

5. A cooktop according to claim 1, wherein the paint contains dispersants comprising surfactants, gum arabic, or serinol pyrrole, to prevent or limit the agglomeration of the particles.

6. A cooktop according to claim 1, wherein said base has an upper surface defining a cooking surface and wherein said conductive particles are carbon nanotubes in a quantity that the cooking surface takes on a black color.

7. A cooktop according to claim 1, wherein said coating has a final thickness of 1 to 200 µm.

8. A cooktop according to claim 1, wherein the entire coating or portions of the entire coating are a sheath or flexible film or in the form of a rigid plate applied to the base.

9. A method for producing a cooktop comprising the step of applying to a lower surface of a glass-ceramic base a paint containing electrically conductive particles dispersed in a silicone or polyester-silicone or epoxy-silicone resin, wherein said conductive particles are selected from the group consisting of multi-wall carbon nanotubes, single-wall carbon nanotubes, graphene, copper metallic particles, nickel metallic particles, or combinations thereof.

10. A method of using a paint containing electrically conductive dispersed particles in a silicone or polyester-silicone or epoxy-silicone resin, wherein said conductive particles are selected from the group consisting of multi-wall carbon nanotubes, single-wall carbon nanotubes, graphene, copper metallic particles, nickel metallic particles, or combinations thereof; producing a total or partial coating of a lower surface of a base for a cooktop made of glass-ceramic.

* * * * *